C. R. CLARK.
PISTON RING GROOVE.
APPLICATION FILED APR. 16, 1919.
1,334,888.
Patented Mar. 23, 1920.
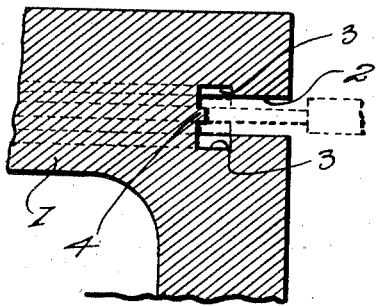
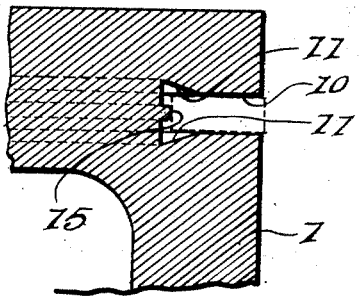
Inventor
C.R.Clark.
By Watson E. Coleman.
Attorney

UNITED STATES PATENT OFFICE.

CHERRY R. CLARK, OF MUSKEGON, MICHIGAN.

PISTON-RING GROOVE.

1,334,888.  Specification of Letters Patent.  Patented Mar. 23, 1920.

Application filed April 16, 1919. Serial No. 290,384.

*To all whom it may concern:*

Be it known that I, CHERRY R. CLARK, a citizen of the United States, residing at Muskegon, in the county of Muskegon and State of Michigan, have invented certain new and useful Improvements in Piston-Ring Grooves, of which the following is a specification, reference being had to the accompanying drawings.

This invention relates to the art of pistons and piston ring packings, and more especially to piston ring grooves.

Heretofore it has been found that piston rings bind in their grooves, owing to the taper of the grooves, and obviously this binding action prevents the ring from having a free movement.

Therefore, as one of the objects of the invention, it is the aim to provide a simple, improved and practical piston ring groove, in which the walls of the groove are not tapered in a manner to cause the ring to bind, allowing the piston ring to have free movements.

The invention further provides a pocket adjacent the bottom of the groove, acting as a reservoir for lubricant, whereby the piston ring may be kept well lubricated. Owing to the lubrication in the reservoir, and since there is no binding of the ring in the groove, allowing free movement of the ring, the compression in the engine cylinder is increased, whereby the power of the motor is greatly increased.

The construction of the piston ring groove in the manner to be hereinafter set forth, considerably reduces or cuts down the scraps, caused by oversized ring grooves, and also eliminates re-machine work caused by undersized and tapered ring grooves, which are common in the construction of straight wall grooves.

The type of ring grooves herein shown and set forth may be used in various types of pistons of various makes of engines.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:

Figure 1 is a sectional view through a piston, showing a ring groove constructed therein, the inner portions of the side walls near the bottom of the groove being undercut, there being a bead or rib in the bottom of the groove to act to space the piston ring from the bottom of the groove.

Fig. 2 is a sectional view through a piston, showing a modified construction of undercut side walls, the side walls, in fact, in this instance, are provided with diverging portions near the bottom of the ring groove.

Referring more especially to the drawings 1 designates the piston as a whole, which may be any suitable construction. However, this piston is provided with a packing ring receiving groove 2. It is to be observed that the side walls of this groove are provided with undercut portions 3 adjacent to and contiguous with the bottom of the goove. Also the bottom of the groove is provided with an annular boss or bead 4. The construction of piston ring receiving groove shown in Fig. 1 may be constructed by a special tool (not shown). It is to be noted that by the provision of a piston ring receiving groove of this particular character, a packing or piston ring may be so supported in the groove upon the annular boss 4, as to provide an annular pocket adjacent the bottom of the groove. This pocket extends from one side of the ring to the other and is particularly adapted for the collection of lubricant, whereby the piston ring may be kept thoroughly lubricated. By so thoroughly lubricating the piston ring, it is permitted to have free movements, allowing it to easily and freely contract and expand, and when expanded to firmly press against the side wall of the piston chamber, hence insuring increased compression in the chamber, thereby resulting in more efficient power. Owing to the annular boss, the piston ring is prevented from contacting with the full area of the bottom of the groove. In fact, the piston ring is afforded a single minimum contact with the annular boss, and furthermore, it is obvious that the piston ring is capable of engaging and disengaging the annular boss, during the action of the piston, enabling the lubricant to pass from one side of the pocket to the other.

In Fig. 2, the piston is provided with a piston ring receiving groove 10, the side walls immediately adjacent the bottom of the groove being provided with undercut portions 11, which diverge toward the bottom of the groove, the diverging under-cut portions 11 of the groove 10 also affording a lubricant receiving pocket in order to insure lubrication and free movement of the piston ring. An especially constructed tool (not shown) may be employed for forming the diverging portions 11. The bottom of the ring groove in Fig. 2 is provided with a boss or rib 15, which may also be formed, when using the especially constructed tool.

The invention having been set forth, what is claimed as new and useful is:

1. In the construction of ring grooves, the combination with a piston body having an annular ring groove formed therein, the side walls of the groove contiguous to the bottom of the groove being provided with undercut portions, the bottom of the groove having an annular boss barely engaged by the piston ring, thereby offsetting the piston ring from the bottom of the groove, and when the piston ring expands and moves out of contact with the boss, communication is afforded between the opposite undercut portions of the side walls of the groove, so as to afford a lubricant receiving pocket.

2. The combination with a piston body, provided with an annular ring receiving groove, of piston ring engaging said groove, the side walls of the groove contiguous with its bottom having undercut portions, and means formed on the bottom of the groove and constituting a part thereof, and with which the piston ring has an infinitesimal point of contact, thereby holding the ring from contact with the full area of the bottom of the groove, and whereby when the ring vibrates out of engagement with the means, due to the contraction and expansion of the ring, communication is afforded between the opposite undercut portions of the side walls of the groove, to insure a thorough circulation of the lubricant.

3. The combination with a piston body having a piston receiving groove, the opposite side walls thereof adjacent the bottom of the groove having diverging undercut parts, of a piston ring mounted in the groove, and means formed on the bottom of the groove with which the ring has an infinitesimal point of engagement, whereby when the ring vibrates from engagement with said means due to the expansion of the ring, communication is afforded between the opposing diverging undercut portions of the side walls of the groove, thereby affording a thorough circulation of the lubricant.

In testimony whereof I hereunto affix my signature in the presence of two witnesses.

CHERRY R. CLARK.

Witnesses:
GEORGE D. VANDERWERP,
SARA KLOOSTERHOUSE.